(12) United States Patent
Nakai (10) Patent No.: US 8,477,229 B2
(45) Date of Patent: Jul. 2, 2013

(54) IMAGING APPARATUS

(75) Inventor: Yasunori Nakai, Nara (JP)

(73) Assignee: Panasonic Corporation, Osaka (JP)

( * ) Notice: Subject to any disclaimer, the term of this patent is extended or adjusted under 35 U.S.C. 154(b) by 51 days.

(21) Appl. No.: 13/161,590

(22) Filed: Jun. 16, 2011

(65) Prior Publication Data
US 2011/0310285 A1    Dec. 22, 2011

(30) Foreign Application Priority Data

Jun. 18, 2010  (JP) .................................. 2010-138854

(51) Int. Cl.
*H04N 5/222*    (2006.01)
(52) U.S. Cl.
USPC ............ 348/333.06; 348/333.01; 348/333.13; 396/383
(58) Field of Classification Search
USPC ............. 348/333.06, 333.07, 333.01–333.13; 396/383
See application file for complete search history.

(56) References Cited

U.S. PATENT DOCUMENTS

| | | | |
|---|---|---|---|
| 6,091,450 A | | 7/2000 | Hirasawa |
| 6,549,237 B1 * | | 4/2003 | Inuma et al. ............. 348/333.06 |
| 7,885,537 B1 * | | 2/2011 | Kuss ............................. 396/374 |
| 2004/0263659 A1 * | | 12/2004 | Abe ......................... 348/333.01 |
| 2009/0251586 A1 * | | 10/2009 | Takeuchi ................. 348/333.01 |
| 2011/0050974 A1 * | | 3/2011 | Nakai et al. .............. 348/333.01 |

FOREIGN PATENT DOCUMENTS

| | | |
|---|---|---|
| JP | 10-004509 | 1/1998 |
| JP | 2003-309746 | 10/2003 |
| JP | 2008-225227 | 9/2008 |
| JP | 2009-130825 | 6/2009 |
| JP | 2009-198684 | 9/2009 |

\* cited by examiner

*Primary Examiner* — Sinh Tran
*Assistant Examiner* — Paul Berardesca
(74) *Attorney, Agent, or Firm* — Panasonic Patent Center (57) ABSTRACT

An imaging apparatus includes an imaging unit configured to capture a subject image to generate image data, a first display unit configured to display the image data generated by the imaging unit and to be capable of taking a reference position and a position different from the reference position, a proximity sensor configured to sense proximity of an object to the first display unit, a position sensor configured to sense whether the first display unit is at the reference position, a second display unit configured to display the image data generated by the imaging unit, and a controller configured to perform control, when the position sensor senses that the first display unit is not at the reference position, to activate the proximity sensor, and to operate the first display unit when the proximity sensor senses proximity of an object, and to operate the second display unit when the proximity sensor does not sense proximity of an object.

11 Claims, 7 Drawing Sheets

IMAGING APPARATUS

BACKGROUND

1. Technical Field

The technical field relates to an imaging apparatus having a plurality of display units including a movable display unit.

2. Related Art

JP10-004509A discloses an imaging apparatus including two types of display units, a viewfinder and a monitor. The imaging apparatus includes an eye proximity sensor. When the proximity of the user's eye to the viewfinder is sensed by the eye proximity sensor, the monitor display is turned off. When the eye proximity is not sensed, the viewfinder display is turned off. By this control, an imaging apparatus which is easy to operate and capable of reducing wasted power consumption is implemented.

In the imaging apparatus disclosed in the above-described JP10-004509A, when the display switching between the viewfinder and the monitor is set to "manual switching" instead of "automatic switching" which is performed based on the detection result of the eye proximity sensor, and the setting is performed to turn off the viewfinder display (turn on the monitor display), even if the user looks through the viewfinder, nothing is displayed on the viewfinder. In such circumstances, when the user wants to check a subject by looking through the viewfinder, he/she needs to take the trouble to perform an operation to turn on the viewfinder display. Thus, the operation becomes troublesome, causing a problem of poor usability.

SUMMARY

An imaging apparatus capable of solving the above-described problem is provided that has improved usability of switching between a plurality of display units.

In a first aspect, an imaging apparatus includes: an imaging unit configured to capture a subject image to generate image data; a first display unit configured to display the image data generated by the imaging unit and to be capable of being positioned at a reference position and a position different from the reference position; a proximity sensor configured to sense proximity of an object to the first display unit; a position sensor configured to sense whether the first display unit is positioned at the reference position; a second display unit configured to display the image data generated by the imaging unit; and a controller configured to perform control such that, when the position sensor senses that the first display unit is not positioned at the reference position, the controller activates the proximity sensor, and operates the first display unit when the proximity sensor senses the object is proximate to the first display unit, and operates the second display unit when the proximity sensor does not sense the object is proximate to the first display unit.

In a second aspect, an imaging apparatus to which a first display unit is mountable is provided. The first display unit is a display unit configured to display captured image data and capable of being positioned at a reference position and a position different from the reference position. The imaging apparatus includes: a second display unit configured to display captured image data; a position determining unit configured to determine whether the first display unit is positioned at the reference position; a proximity determining unit configured to determine whether the object is in proximity to the first display unit; and a controller configured to control the first and second display units. In a case where the position determining unit determines that the first display unit is not positioned at the reference position, the controller performs control to operate the first display unit when the proximity determining unit determines that the object is in proximity to the first display unit, and to operate the second display unit when the proximity determining unit does not determine that the object is in proximity to the first display unit.

According to the imaging apparatus of the above aspect, when the first display unit (e.g., an external viewfinder) is moved from the reference position, the proximity sensor is forcibly activated, and when the proximity sensor senses the proximity of an object, the first display unit is operated. By this, for example, even if the automatic switching function of the display unit is set to invalid, when the user rotates the first display unit (e.g., an external viewfinder) to use the first display unit (the external viewfinder), the automatic switching function of the display unit becomes valid. Hence, the setting for changing the display unit which is performed due to a change in user's shooting style is facilitated, improving the usability of the imaging apparatus.

DETAILED DESCRIPTION OF PREFERRED EMBODIMENTS

1. First Embodiment

1-1. Overview

A camera system according to the present embodiment includes an interchangeable lens and a camera body. An external viewfinder is mountable on the camera system through a connector. The camera body includes a rear liquid crystal monitor (hereinafter, referred to as a "rear monitor") and a connector for connecting the external viewfinder (hereinafter, referred to as a "connector"). The external viewfinder includes an eye proximity sensor, a liquid crystal display unit (hereinafter, referred to as a "finder monitor"), and a detection switch that detects a state of the external viewfinder.

The following embodiment describes a camera system to which an external viewfinder is mounted, that is, a camera system including two display monitors (a rear monitor and an external viewfinder), which further facilitates the setting performed due to a change in user's shooting style, thereby providing excellent usability.

An embodiment in which the idea of the present application is applied to a lens-interchangeable camera system will be described below using the drawings.

1-2. Configuration

Figure 1:
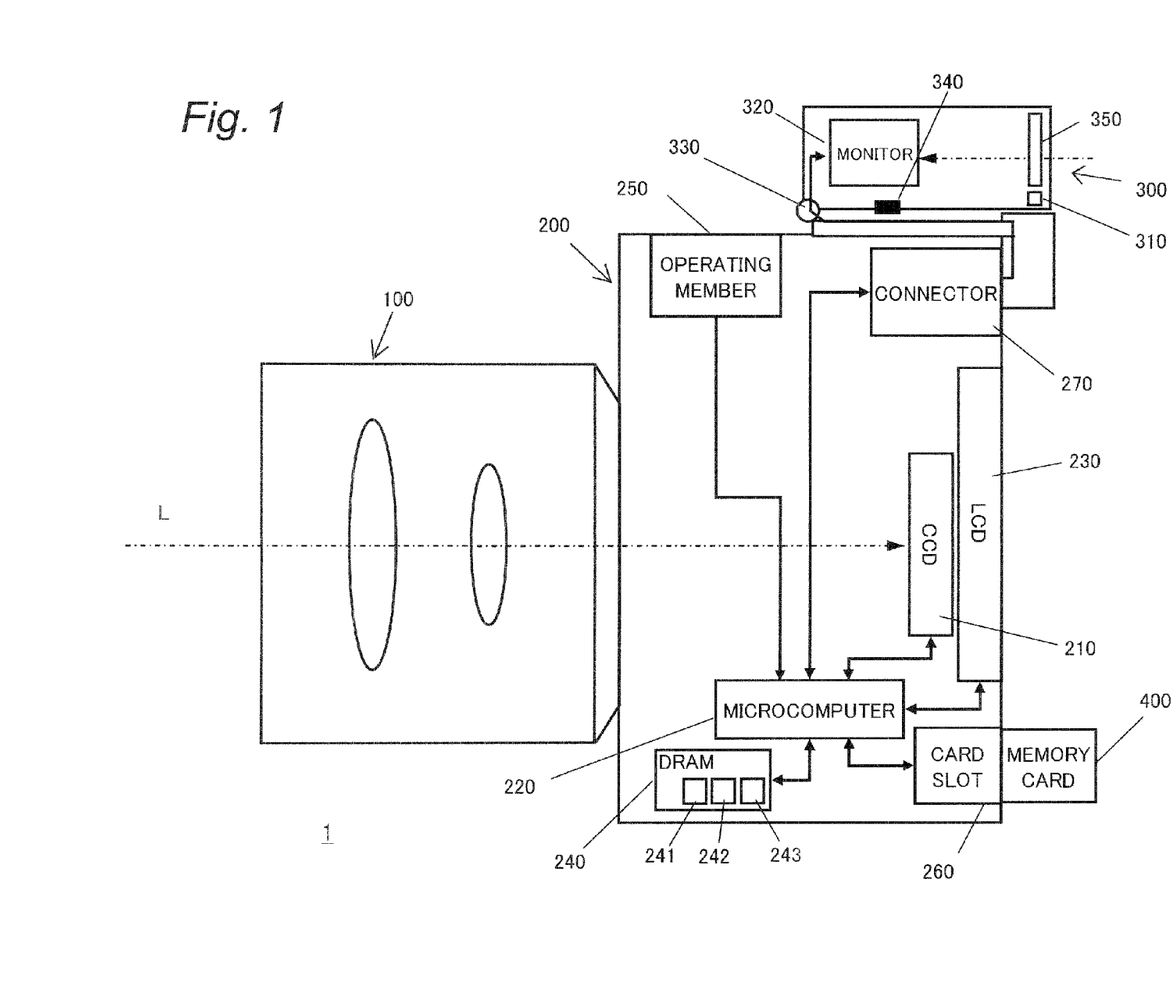
FIG. 1 is a block diagram showing an electrical configuration of a camera system.
Figure 2:
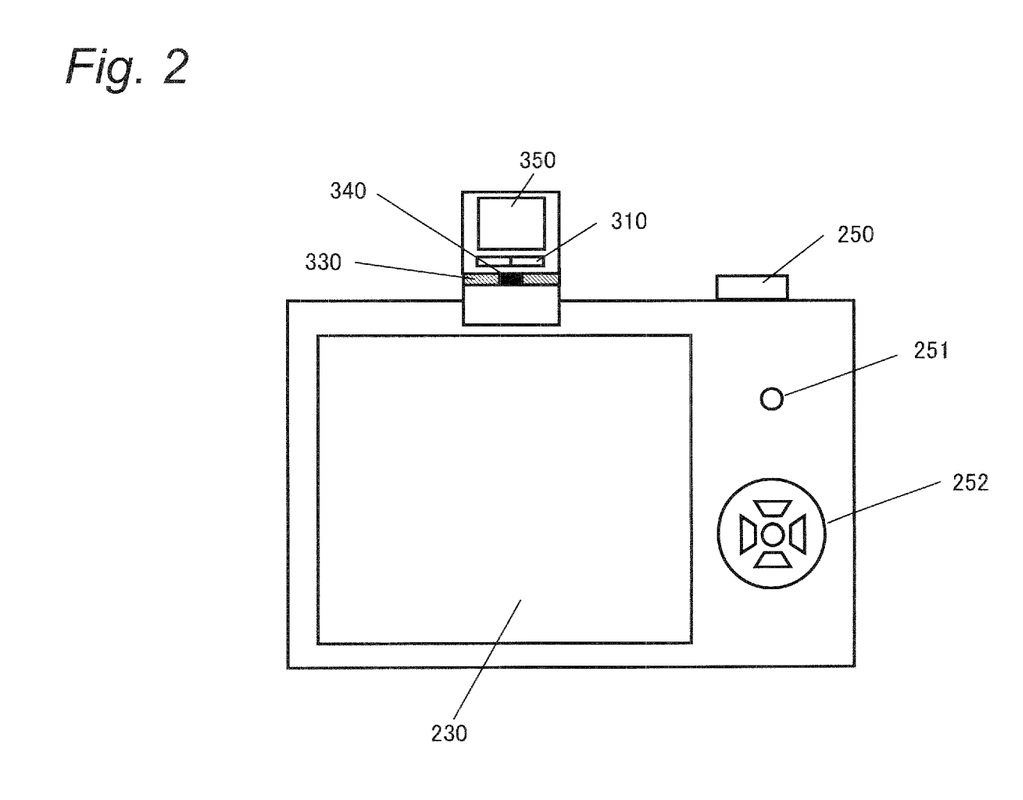
FIG. 2 is a rear view of the camera system.

FIG. 1 is a block diagram showing a configuration of a camera system 1 according to a first embodiment. FIG. 2 is a schematic diagram showing a rear view of the camera system 1 according to the first embodiment. The camera system 1 includes an interchangeable lens 100, a camera body 200, and an external viewfinder 300. The interchangeable lens 100 has a zoom lens and a focus lens (not shown) and guides light passing through the interchangeable lens 100 to the camera body 200.

The camera body 200 includes a CCD image sensor 210, a microcomputer 220, a rear monitor 230, a DRAM 240, an operating member 250, a card slot 260, and a connector 270.

In the camera system 1, the CCD image sensor 210 captures a subject image incident through the interchangeable lens 100, and converts the subject image into an electrical signal to generate image data. The microcomputer 220 performs various image processing and compression processes on the generated image data and stores the processed image data in a memory card 400. A detail of each component will be described below.

The microcomputer 220 controls the overall operation of the camera system 1 according to an instruction from the operating member 250. For example, the microcomputer 220 performs various image processing including gamma correction, flaw correction, white balance correction and the like, and compression processes including a JPEG compression process, an MPEG compression process and the like, on the image data obtained from the CCD image sensor 210. The microcomputer 220 uses the DRAM 240 as a working memory during control operation and image processing.

The DRAM 240 stores at least the following three flags 241, 242, and 243 which are used for control.

Automatic switching flag 241: a flag indicating user's setting state for "automatic display monitor switching"

Eye proximity sensing operation flag 242: a flag that is referred by the microcomputer 220 to determine whether to actually perform an eye proximity sensing operation Display monitor flag 243: a flag indicating a display monitor to be operated (to function) when the eye proximity sensing operation flag 242 is OFF (that is, when automatic switching of the display monitor is not performed)

The value (ON and OFF) of each flag and the meanings indicated by each value are as follows:

|  | ON | OFF |
| --- | --- | --- |
| Automatic switching flag | Automatic switching | Manual switching |
| Eye proximity sensing operation flag | Eye proximity sensor: Active | Eye proximity sensor: Inactive |
| Display monitor flag | Rear monitor | External viewfinder |

In the camera system 1, a setting menu can be displayed on the rear monitor 230 and a user can set various functions of the camera system 1 on the setting menu. The setting menu has, for example, an item of "automatic display monitor switching" which is a setting for automatically switching a display monitor based on the sensing result of an eye proximity sensor 310 (see FIG. 3B).

When the "automatic display monitor switching" setting is turned on by the user on the setting menu, that is, automatic switching is set, the microcomputer 220 sets the automatic switching flag 241 to "ON". When the "automatic display monitor switching" setting is turned off by the user, that is, manual switching is set, the microcomputer 220 sets the automatic switching flag 241 to "OFF". As such, the automatic switching flag 241 indicates the contents of the setting for automatic display monitor switching, which is set by the user on the setting menu.

When the eye proximity sensing operation flag 242 is ON, the microcomputer 220 activates the eye proximity sensor 310. At this time, the microcomputer 220 performs switching of a display monitor to be operated based on the sensing result of the eye proximity sensor 310. When the eye proximity sensing operation flag 242 is OFF, the microcomputer 220 stops or inactivates the operation of the eye proximity sensor 310. At this time, the microcomputer 220 determines a display monitor to be operated (a display monitor for displaying an image), based on the value of the display monitor flag 243.

The display monitor flag 243 takes the value "ON" when the display monitor to be operated is the rear monitor 230, and takes the value "OFF" when the display monitor to be operated is an external viewfinder 300 (that is, a finder monitor 320). The microcomputer 220 sets the eye proximity sensing operation flag 242 based on the connection state of the external viewfinder 300, the state of the automatic switching flag 241, and the state of a detection switch 340. The setting of the eye proximity sensing operation flag 242 will be described in detail later.

The rear monitor 230 is provided at the rear of the camera body 200. The finder monitor 320 is provided in the external viewfinder 300. The user can check an image captured by the CCD image sensor 210, by looking at the finder monitor 320 inside the external viewfinder 300. The rear monitor 230 and the finder monitor 320 display an image represented by image data subjected to various image processing, and the like, by the microcomputer 220. The rear monitor 230 and the finder monitor 320 can display through images and still images represented by image data recorded in the memory card 400. The through image is a moving image which is displayed to allow a user to determine a composition upon still image shooting, but is not yet recorded.

The rear monitor 230 and the finder monitor 320 can display a setting menu. For example, the rear monitor 230 and the finder monitor 320 can display, as setting menus, a menu screen for setting the number of pixels of data on an image to be shot, a menu screen for setting exposure, a menu screen for setting 150 sensitivity, and the like In particular, in the present embodiment, when the external viewfinder 300 is connected to the camera body 200, the rear monitor 230 and the finder monitor 320 can display a setting menu including the aforementioned "automatic display monitor switching" setting item (see FIG. 3B).

The operating member 250 is a collective term for various operating members. Examples of the operating member 250 include a function button 251 and a cross key 252 which will be described later. The operating member 250 may include a touch panel.

The memory card 400 can be placed in the card slot 260. The memory card 400 can store image data generated by the microcomputer 220. The memory card 400 can also output the stored data to the microcomputer 220.

The connector 270 is a connecting device that electrically connects the external viewfinder 300 to the camera body 200. The microcomputer 220 communicates data such as external viewfinder mount information, image data, information as to whether there is an eye proximity sensor, and information on an eye proximity sensing state, with the external viewfinder 300 through the connector 270. The external viewfinder mount information is information indicating whether the external viewfinder 300 is connected to the connector 270, and is used by the microcomputer 220 to determine whether the external viewfinder 300 is connected to the connector 270. When the external viewfinder 300 includes the eye proximity sensor 310, as information as to whether there is an eye proximity sensor, information indicating that the external viewfinder 300 includes an eye proximity sensor is sent to the microcomputer 220 from the external viewfinder 300 through the connector 270. In the present embodiment, the external viewfinder 300 includes the eye proximity sensor 310, but when the external viewfinder 300 does not include the eye proximity sensor 310, information indicating that an eye proximity sensor is not included may be sent to the microcomputer 220.

The external viewfinder 300 includes a hinge 330 that can change the orientation of the external viewfinder 300, that is, the eye proximity sensor 310 and the finder monitor 320; the detection switch 340 that detects a rotation state (position) of the external viewfinder 300; and an eye proximity window 350 through which the user looks the finder monitor 320.

The eye proximity sensor 310 is disposed at the rear of the external viewfinder 300 and near the eye proximity window 350. The eye proximity sensor 310 senses the proximity of an object, that is, whether there is an object within a predetermined distance from the eye proximity sensor 310. When the eye proximity sensor 310 senses the presence of an object, the eye proximity sensor 310 sends information indicating that it is in an eye proximity sensing state, to the microcomputer 220 through the connector 270. On the other hand, when the eye proximity sensor 310 does not sense the presence of an object, the eye proximity sensor 310 sends information indicating that it is in an eye proximity non sensing state, to the microcomputer 220 through the connector 270. When the user looks the finder monitor 320 through the eye proximity window 350, the eye proximity sensor 310 senses that there is an object (e.g., a part of the user's face) within the predetermined distance, and thus, sends information indicating an eye proximity sensing state to the microcomputer 220.

Figure 4A:
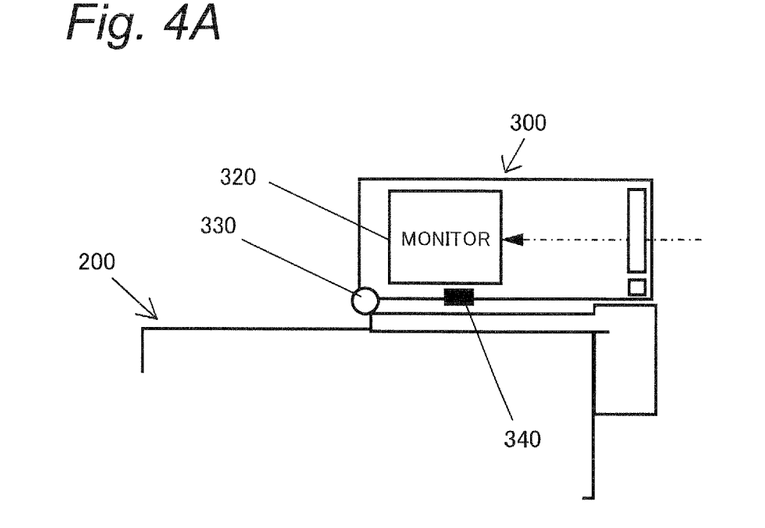
FIG. 4A is a diagram for describing a closed state of an external viewfinder and FIG. 4B is a diagram for describing a van-angle state of the external viewfinder.
Figure 4B:
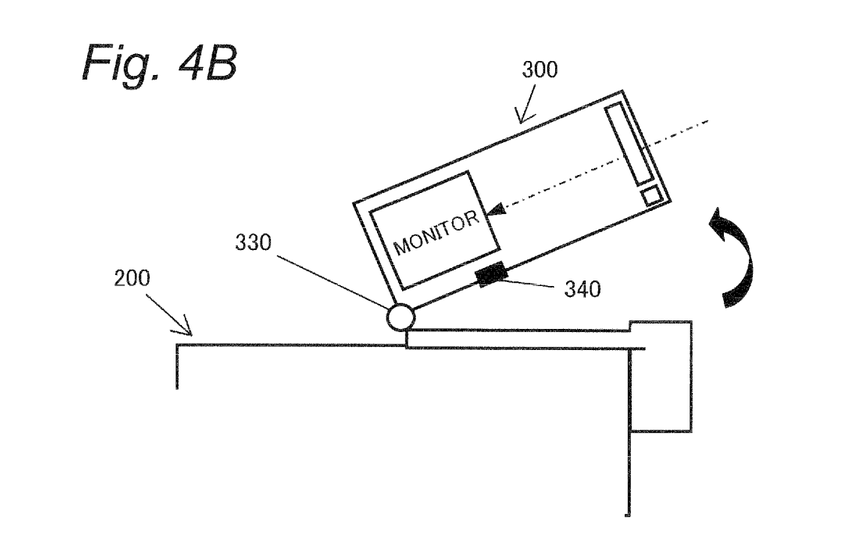

The finder monitor 320 of the external viewfinder 300 can change its angle (position) in an vertical direction, with the hinge 330 being a rotating shaft. The rotating shaft of the hinge 330 is parallel to a horizontal direction of the camera body 200. Specifically, the external viewfinder 300 can take a closed state (reference state) in which the underside of the external viewfinder 300 is parallel to the topside of the camera body 200 as shown in FIG. 4A; and a state (hereinafter, referred to as a "vari-angle state") in which the external viewfinder 300 is rotated upward with the hinge 330 being a rotating shaft from the closed state as shown in FIG. 4B. Note that the position when the external viewfinder 300 is in the closed state is a reference position of the external viewfinder 300.

The detection switch 340 is a switch which detects whether the state of the external viewfinder 300 is the closed state or the van-angle state. When the external viewfinder 300 is in the closed state, the detection switch 340 is OFF. When the external viewfinder 300 is in the van-angle state, the detection switch 340 is am. When in the closed state, the finder monitor 320 is oriented toward the rear of the camera body 200. That is, when the external viewfinder 300 is in the closed state, the orientation of the finder monitor 320 substantially matches the direction of an optical axis L of the interchangeable lens 100.

Referring to FIG. 2, the eye proximity sensor 310 is disposed near the lower portion of the eye proximity window 350. When the user rotates the external viewfinder 300 upward about the hinge 330, the eye proximity sensor 310 rotates upward together with the eye proximity window 350 and the finder monitor 320. When the user looks at the finder monitor 320 through the eye proximity window 350, a part of the face covers the eye proximity sensor 310, and thus the eye proximity sensor 310 senses that there is an object within the predetermined distance, and sends a sensing signal to the microcomputer 220 through the connector 270.

The user can shoot a still image by full-pressing a release button. The cross key 252 includes up, down, left, and right buttons and a set button located at the center thereof. The user can perform, for example, selection on a menu as a GUI displayed on the rear monitor 230 or the finder monitor 320, by pressing the various buttons of the cross key 252.

1-2-1. Term Correspondence

The CCD image sensor 210 is an example of an imaging unit. The finder monitor 320 is an example of a first display unit. The position of the finder monitor 320 in the closed state is an example of a reference position. The eye proximity sensor 310 is an example of a proximity sensor. The detection switch 340 is an example of a position detector. The rear monitor 230 is an example of a second display unit. The microcomputer 220 is an example of a controller. Also, the microcomputer 220 is an example of a position determining unit and a proximity determining unit.

Figure 5:
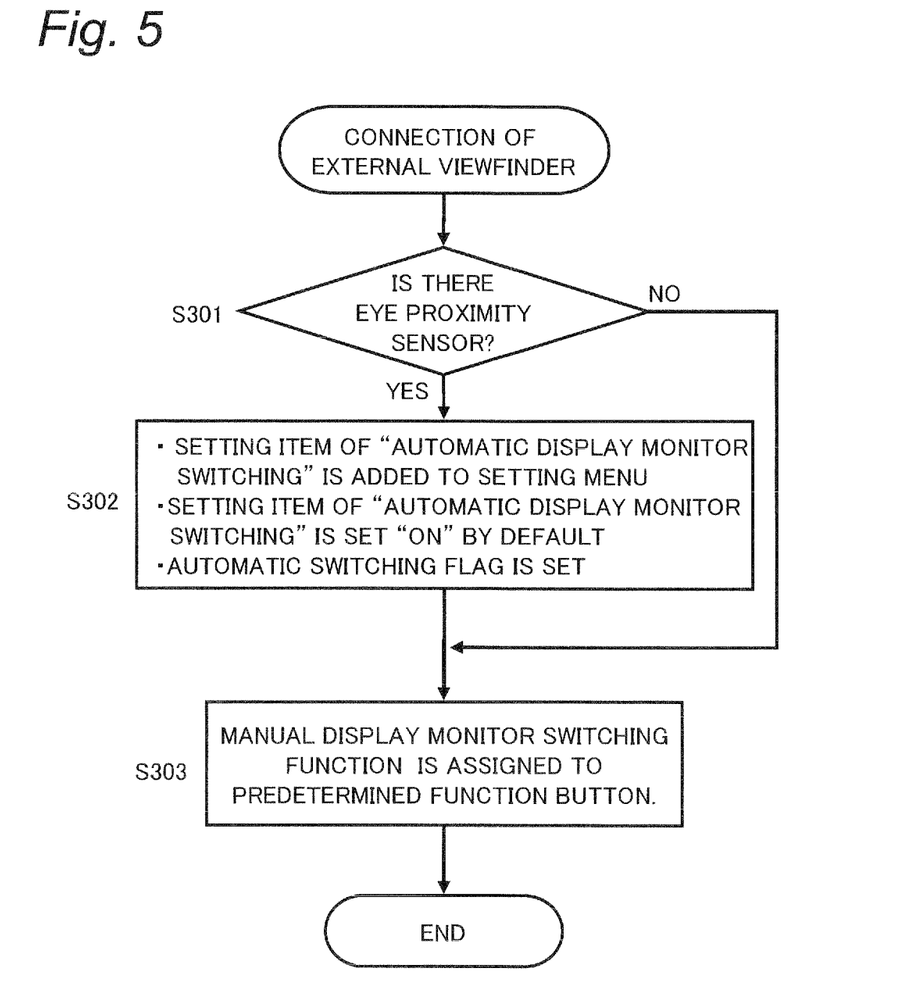
FIG. 5 is a flowchart for describing an operation performed when the external viewfinder is connected to a camera body of the camera system according to a first embodiment.

1-3. Operation 1-3-1. Operation Performed when the External Viewfinder is Connected FIG. 5 is a flowchart for describing an operation performed when the external viewfinder 300 is connected to the camera body 200 of the camera system 1 according to the first embodiment.

When the microcomputer 220 detects that the external viewfinder 300 has been connected to the connector 270 of the camera body 200, the microcomputer 220 detects whether there is the eye proximity sensor 310 (S301).

Now, an example of a method of detecting whether there is the eye proximity sensor 310 will be described. When the microcomputer 220 in the camera body 200 and a microcomputer (not shown) in the external viewfinder 300 confirm that the external viewfinder 300 has been connected to the camera body 200 through the connector 270, communication starts between the microcomputers, and the microcomputer 220 in the camera body 200 determines whether there is the eye proximity sensor 310. Alternatively, if the external viewfinder 300 has the function of outputting an identification signal indicating that an eye proximity sensor is included, the microcomputer 220 may determine that a viewfinder including an eye proximity sensor has been attached, when receiving the identification signal from the external viewfinder 300. Alternatively, it may be set on the menu whether the external viewfinder 300 includes the eye proximity sensor 310.

Figure 3A:
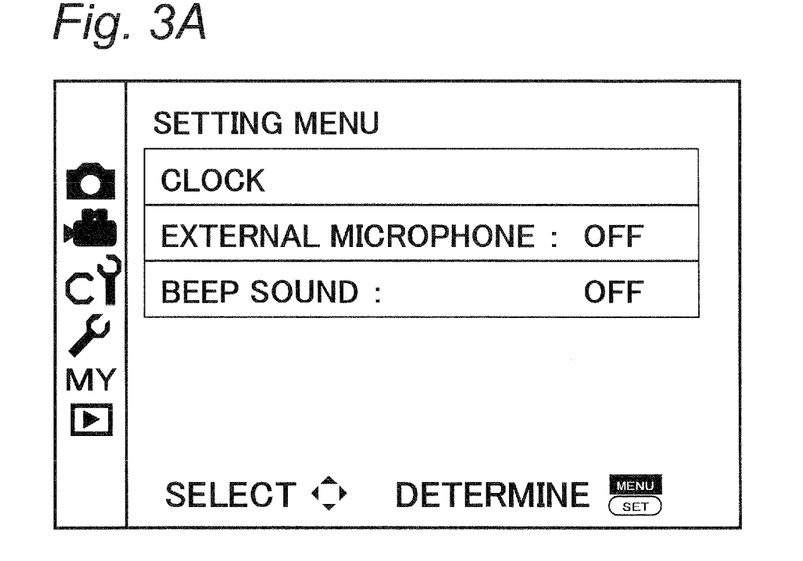
FIG. 3A is a diagram for describing a setting menu and FIG. 3B is a diagram for describing a setting menu having the "automatic display monitor switching" item added thereto.
Figure 3B:
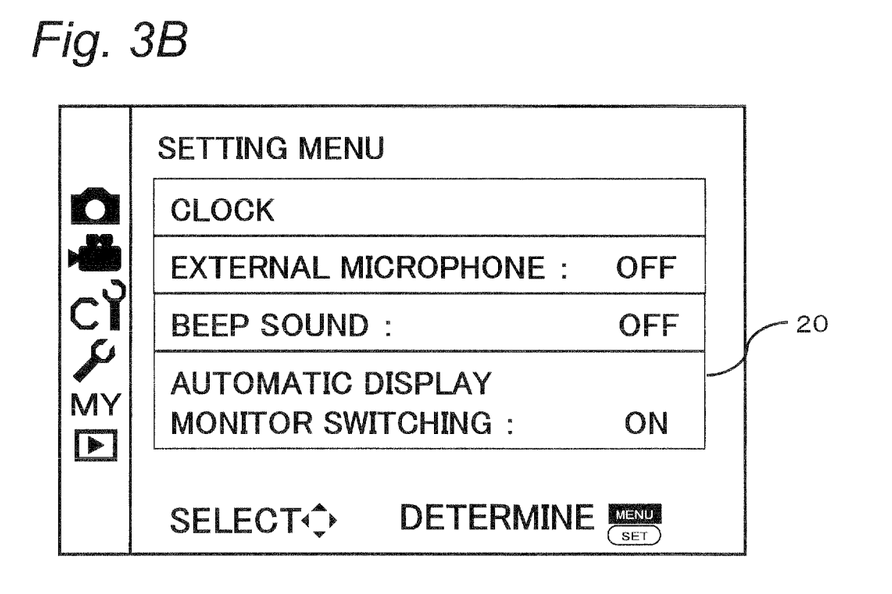
Figure 6:
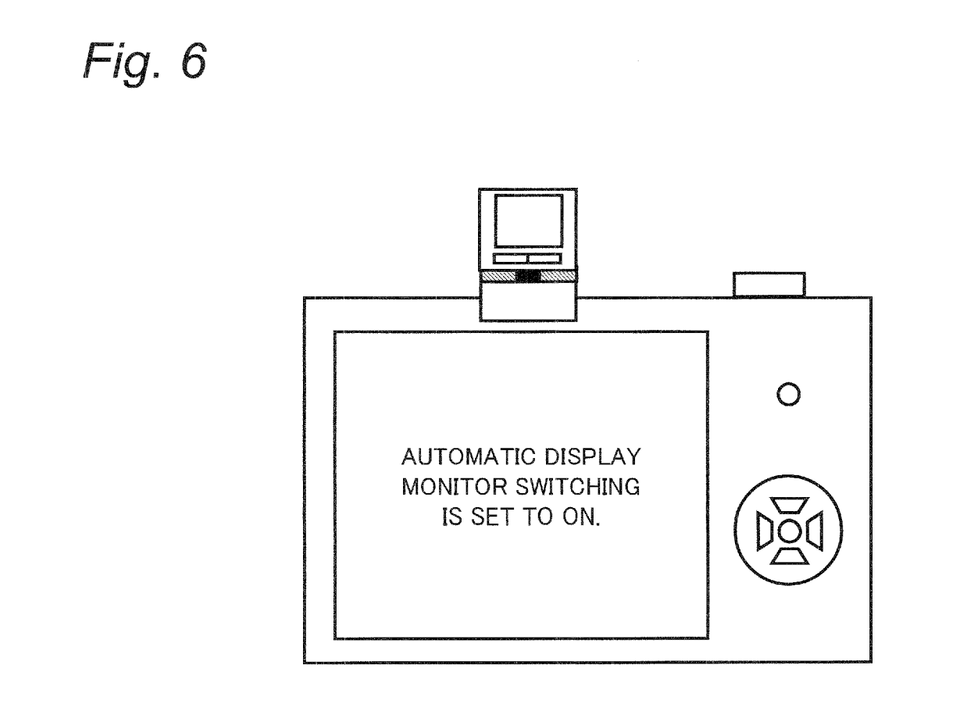
FIG. 6 is a diagram showing an example of a message displayed when the external viewfinder is mounted on the camera body.

If the microcomputer 220 senses the presence of the eye proximity sensor 310 by the method as described above (YES at S301), the microcomputer 220 adds the "automatic display monitor switching" setting item to the setting menu (S302). Specifically, in the present embodiment, normally, as shown in FIG. 3A, the "automatic display monitor switching" item is not displayed on the setting menu. When the presence of the eye proximity sensor 310 is sensed, as shown in FIG. 3B, the "automatic display monitor switching" item 20 is added to the setting menu. At the same time, the microcomputer 220 sets the initial setting of the "automatic display monitor switching" to ON, that is, sets "automatic switching" where the display monitors are automatically switched based on the sensing result of the eye proximity sensor 310, and sets the automatic switching flag 241 to ON. Note that at this time a message indicating that the automatic display monitor switching setting is set to ON may be displayed on the rear monitor 230 to notify it to the user (see FIG. 6).

Then, the microcomputer 220 assigns a manual display monitor switching function to the predetermined function button 251 (S303). The manual display monitor switching function is the function of forcibly switching the display monitor to the rear monitor 230 or the external viewfinder 300 by a user's manual operation. Each time the function button 251 is pressed by the user, the microcomputer 220 switches the display monitor to be operated between the rear monitor 230 and the finder monitor 320, and changes the value of the display monitor flag 243 in association with the switched display monitor. Note that the manual display monitor switching function may be assigned to any of the buttons included in the operating member 250, instead of the function button 251.

On the other hand, if the microcomputer 220 does not sense the presence of the eye proximity sensor 310 (NO at S301), the microcomputer 220 assigns the manual display monitor switching function to the function button 251 (S303).

By the above-described operation, when the external viewfinder 300 is connected to the camera body 200, the external viewfinder 300 can be used in a state in which the external viewfinder 300 and the rear monitor 230 can be automatically switched. Thereafter, the user can change the setting as to whether automatic display monitor switching is performed (the setting of the automatic switching flag 241), on the "automatic display monitor switching" item 20 (see FIG. 3B) which is added to the menu.

1-3-2. Display Monitor Switching Operation

A display monitor switching operation of the camera system 1 of the present embodiment will be described. In the present embodiment, switching of the display monitor to be operated is performed when: 1) the connection of the external viewfinder 300 to the camera body 200 is sensed; 2) the automatic switching flag 241 is changed by the user changing the setting of the "automatic display monitor switching" item on the menu; or 3) the state of the detection switch 340 is changed.

Figure 7:
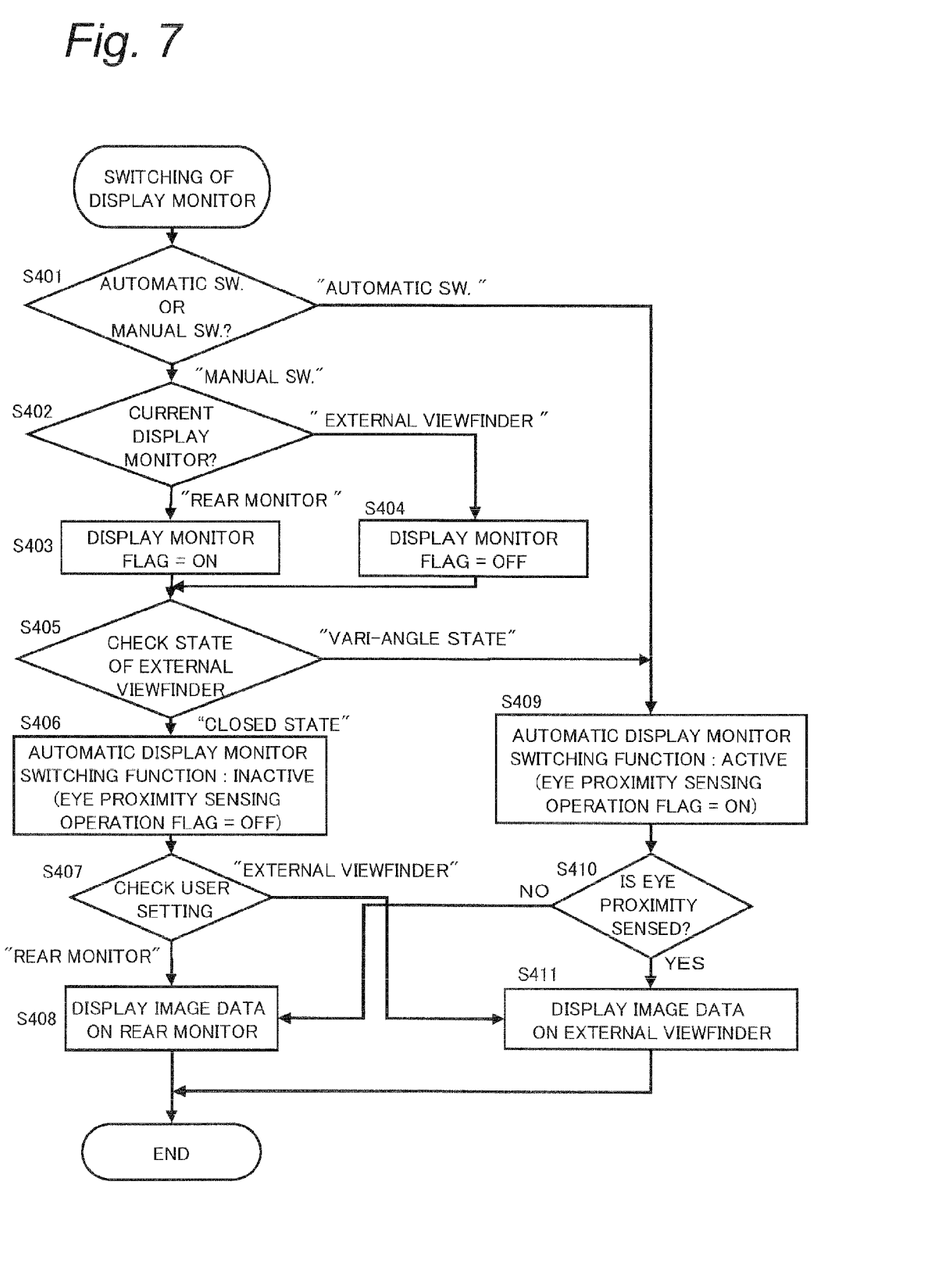
FIG. 7 is a flowchart for describing a display monitor switching operation of the camera system according to the first embodiment.

FIG. 7 is a flowchart for describing a display monitor switching operation of the camera system 1 according to the present embodiment.

When the microcomputer 220 senses that the above-described setting/state is changed, first, the microcomputer 220 determines, based on the automatic switching flag 241, whether the display monitor switching is set to automatic switching or manual switching (S401).

If the automatic switching flag 241 is set to ON, that is, set to "automatic switching" by the user on the menu, then the microcomputer 220 sets the eye proximity sensing operation flag 242 to ON to activate the automatic display monitor switching function (5409). The microcomputer 220 receives a sensing result from the eye proximity sensor 310 and thereby checks an eye proximity sensing state (5410). If the sensing result of the eye proximity sensor 310 indicates an eye proximity sensing state (YES at S410), then the microcomputer 220 sets the external viewfinder 300 as the display monitor to be operated, and an image is displayed on the finder monitor 320 in the external viewfinder 300 (S411). If the sensing result of the eye proximity sensor 310 indicates an eye proximity non-sensing state (NO at S410), then the microcomputer 220 sets the rear monitor 230 as the display monitor to be operated, and an image is displayed on the rear monitor 230 (S408).

On the other hand, if the automatic switching flag 241 is set to OFF at step S401, that is, "manual switching", then the microcomputer 220 checks whether the currently functioning display monitor is the rear monitor 230 or the external viewfinder 300 (S402). If the currently functioning display monitor is the rear monitor 230, then the microcomputer 220 sets the display monitor flag 243 to "ON" (S403). If the currently functioning display monitor is the external viewfinder 300, then the microcomputer 220 sets the display monitor flag 243 to "OFF" (S404).

Then, the microcomputer 220 checks the state of the external viewfinder 300, based on the state of the detection switch 340 (S405). Specifically, when the state of the detection switch 340 is OFF or is changed from ON to OFF, it is determined that the external viewfinder 300 is in the "closed state". Thus, in that case, the microcomputer 220 recognizes that the external viewfinder 300 is in the closed state and thus sets the eye proximity sensing operation flag 242 to OFF to inactivate the automatic display monitor switching function (S406).

Then, the microcomputer 220 checks the user setting for the display monitor by referring to the display monitor flag 243 (S407). Specifically, since the eye proximity sensing operation flag 242 is OFF, the microcomputer 220 determines the display monitor to be operated, based on the display monitor flag 243. When the display monitor flag 243 is "OFF", that is, when the external viewfinder 300 is set as the display monitor to be operated, an image is displayed on the finder monitor 320 in the external viewfinder 300 by the microcomputer 220 (S411). On the other hand, when the display monitor flag 243 is "ON", that is, when the rear monitor 230 is set as the display monitor to be operated, by the microcomputer 220, an image is displayed on the rear monitor 230 (S408).

On the other hand, at step S405, when the state of the detection switch 340 is ON or is changed from OFF to ON, it is determined that the external viewfinder 300 is in the "van-angle state". Thus, in that case, the microcomputer 220 recognizes that the external viewfinder 300 is in the van-angle state and thus sets the eye proximity sensing operation flag 242 to ON to activate the automatic display monitor switching function (S409). Thereafter, in the same manner as above, switching of the display monitor to be operated is performed according to the flags and the result of an eye proximity sensing operation.

1-4. Summary

As described above, a camera system 1 of the present embodiment includes a CCD image sensor 210 that captures a subject image to generate image data; an external viewfinder 300 that displays the image data generated by the CCD image sensor 210 and that can take a reference position (closed state) and a position different from the reference position (vari-angle state); an eye proximity sensor 310 that senses the proximity of an object to the external viewfinder 300; a detection switch 340 that senses whether the external viewfinder 300 is at the reference position; a rear monitor 230 that displays the image data generated by the COD image sensor 210; and a microcomputer 220 that performs control to activate the eye proximity sensor 310 when the detection switch. 340 senses that the external viewfinder 300 is not at the reference position, and performs control to operate the external viewfinder 300 when the eye proximity sensor 310 senses the proximity of an object, and to operate the rear monitor 230 when the eye proximity sensor 310 does not sense the proximity of an object.

By the above-described configuration, even if the display monitor switching setting is set to "manual switching", when the user rotates the external viewfinder 300 upward to place the external viewfinder 300 in a van-angle state, the automatic display monitor switching function is activated. By this, even if the automatic display monitor switching function is set to invalid, when the user rotates the external viewfinder 300 to use the external viewfinder 300, the automatic display monitor switching function becomes valid. Hence, when the user brings his/her eye in proximity to the external viewfinder 300, an image is displayed on the finder monitor 320 in the external viewfinder 300, enabling the user to, for example, check the image through the external viewfinder 300. Accordingly, even if the user changes the shooting style from shooting performed while looking at the rear monitor 230 to shooting performed while looking at the external viewfinder 300, he/she does not need to manually change the display monitor setting and thus the usability of the camera system 1 improves.

2. Other Embodiments

An embodiment is not limited to that described above and various other embodiments are considered. Other embodiments will be summarized below.

In the above-described embodiment, the camera system 1 includes the camera body 200 and the interchangeable lens 100 attachable to the camera body 200. However, the camera body 200 and the lens 100 do not necessarily need to be separable and the lens 100 and the camera body 200 may be formed integrally.

In the above-described embodiment, the external viewfinder 300 is detachable from the camera body 200. However, provided that the finder monitor 320 is rotatable (tilt-operable) upward relative to the camera body 200, the external viewfinder 300 does not need to be a separate unit from the camera body 200 and may be formed integrally with the camera body 200.

Though description is omitted in the above-described embodiment, when the external viewfinder 300 is removed from the camera body 200, the microcomputer 220 determines the rear monitor 230 as the display monitor to be operated.

Although in the above-described embodiment the rear monitor 230 is fixedly mounted to the rear of the camera body 200, the rear monitor 230 does not necessarily need to be fixedly mounted to the rear. For example, a rotating shaft may be provided on a side surface of the camera body and the rear monitor 230 may be provided on the camera body 200 so as to be rotatable about the rotating shaft.

In the above-described embodiment, the eye proximity sensor 310 is disposed adjacent to the eye proximity window 350, and when the user rotates the external viewfinder 300, the eye proximity sensor 310 rotates together with the eye proximity window 350 and the finder monitor 320. However, the eye proximity sensor 310 may be provided on a member on the side of the camera body 200 with respect to the hinge 330.

In the above-described embodiment, when the external viewfinder 300 is connected to the camera body 200, the "automatic display monitor switching" setting item is added to the setting menu (step S302 in the flowchart of FIG. 9. The setting menu may always have the "automatic display monitor switching" setting item. In this case, when the external viewfinder 300 is not connected to the camera body 200, the "automatic display monitor switching" setting is made inoperable, and when the external viewfinder 300 is connected to the camera body 200 and the presence of the eye proximity sensor 310 has been confirmed, the "automatic display monitor switching" setting is made operable.

Although, in the above-described embodiment, the COD image sensor 210 is used as an imaging device, the imaging device is not limited thereto. For example, instead of the CCD image sensor 210, other imaging devices such as a CMOS image sensor and an NMOS image sensor may be used.

INDUSTRIAL APPLICABILITY

The above embodiments further facilitate the setting performed due to a change in user's shooting style and thus can improve usability. Therefore, the above embodiments can also be applied to imaging apparatuses such as digital still cameras and digital video cameras.

What is claimed is:

1. An imaging apparatus comprising:
   a body;
   an imaging unit disposed in the body and configured to capture a subject image to generate image data;
   a first display unit movably mounted on the body and configured to display the image data generated by the imaging unit, the first display unit capable of being positioned at a reference position and a position different from the reference position;
   a proximity sensor configured to sense a proximity of an object to the first display unit;
   a position sensor configured to sense whether the first display unit is positioned at the reference position according to a relative positional relation between the body and the first display unit;
   a second display unit configured to display the image data generated by the imaging unit; and
   a controller configured to perform control such that, when the position sensor senses that the first display unit is not positioned at the reference position, the controller activates the proximity sensor and operates the first display unit when the proximity sensor senses the object is proximate to the first display unit, and operates the second display unit when the proximity sensor does not sense the object is proximate to the first display unit.

2. The imaging apparatus according to claim 1, wherein when the first display unit is mounted to the body of the imaging apparatus, a setting item for an automatic switching between the first display unit and the second display unit is added to a menu for allowing a user to set a function of the imaging apparatus.

3. The imaging apparatus according to claim 1, further comprising an operating member used by a user to provide an instruction to the imaging apparatus, wherein
   when the first display unit is mounted to the body of the imaging apparatus, a function concerning manual switching between the first display unit and the second display unit is assigned to the operating member.

4. The imaging apparatus according to claim 1, wherein when the position sensor senses that the first display unit is positioned at the reference position, the controller performs control to inactivate a function of the proximity sensor.

5. An imaging apparatus to which a first display unit is mountable, the first display unit configured to display captured image data and capable of being positioned at a reference position and a position different from the reference position, the imaging apparatus comprising:
   a body on which the first display unit is movably mountable;

a second display unit configured to display captured image data;

a position determining unit configured to determine whether the first display unit is positioned at the reference position according to a relative positional relation between the body and the first display unit;

a proximity determining unit configured to determine whether an object is in proximity to the first display unit; and a controller configured to control the first and second display units, wherein in a case where the position determining unit determines that the first display unit is not positioned at the reference position, the controller performs control to operate the first display unit when the proximity determining unit determines that the object is in proximity to the first display unit, and to operate the second display unit when the proximity determining unit does not determine that the object is in proximity to the first display unit.

6. The imaging apparatus according to claim 5, wherein when the first display unit is attached to a body of the imaging apparatus, a setting item for automatic switching between the first display unit and the second display unit is added to a menu for allowing a user to set a function of the imaging apparatus.

7. The imaging apparatus according to claim 5, further comprising an operating member for providing an instruction to the imaging apparatus by a user, wherein when the first display unit is attached to a body of the imaging apparatus, a function concerning manual switching between the first display unit and the second display unit is assigned to the operating member.

8. An imaging apparatus comprising:

a body;

a first display unit movably mounted on the body and configured to be positioned at a reference position and a position different from the reference position, the reference position being defined according to a relative positional relation between the body and the first display unit, the first display unit operable to output a display;

a proximity sensor configured to sense a proximity of an object to the first display unit, the proximity sensor operable to be activated when the first display unit is positioned at the position different from the reference position;

a second display unit configured to output a display; and a controller configured to control operation of the first display unit and the second display unit;

wherein, when the first display unit is not positioned at the reference position, the controller operates the first display unit when the proximity sensor senses the object is proximate to the first display unit, and operates the second display unit when the proximity sensor does not sense the object is proximate to the first display unit.

9. The imaging apparatus according to claim 1, wherein the first display unit is a viewfinder, and the second display unit is a liquid crystal monitor.

10. The imaging apparatus according to claim 5, wherein the first display unit is a viewfinder, and the second display unit is a liquid crystal monitor.

11. The imaging apparatus according to claim 8, wherein the first display unit is a viewfinder, and the second display unit is a liquid crystal monitor.

* * * * *